US010161454B2

(12) United States Patent
Balster et al.

(10) Patent No.: US 10,161,454 B2
(45) Date of Patent: *Dec. 25, 2018

(54) ROLLER BEARING REPLACEMENT DEVICE

(71) Applicant: LOI Thermprocess GmbH, Essen (DE)

(72) Inventors: Frank Balster, Nottuln (DE); Horst Wachholder, Essen (DE)

(73) Assignee: LOI Thermprocess GmbH, Essen (DE)

( * ) Notice: Subject to any disclaimer, the term of this patent is extended or adjusted under 35 U.S.C. 154(b) by 234 days.

This patent is subject to a terminal disclaimer.

(21) Appl. No.: 15/000,572

(22) Filed: Jan. 19, 2016

(65) Prior Publication Data

US 2016/0208858 A1    Jul. 21, 2016

(30) Foreign Application Priority Data

Jan. 20, 2015 (EP) ..................... 15151782
Jan. 21, 2015 (EP) ..................... 15151976

(51) Int. Cl.
*F16C 35/06* (2006.01)
*F27B 3/10* (2006.01)
(Continued)

(52) U.S. Cl.
CPC ............ *F16C 35/062* (2013.01); *B08B 9/00* (2013.01); *C03B 35/16* (2013.01); *F27B 3/10* (2013.01);
(Continued)

(58) Field of Classification Search
CPC .......... C03B 35/16; F16C 35/062; F27B 3/10; F27B 9/2407; F27B 9/24; F27B 9/30; F27D 25/00; F27D 3/026
(Continued)

(56) References Cited

U.S. PATENT DOCUMENTS 5,819,354 A   10/1998  Alonso
2014/0165404 A1*  6/2014  Ebner ............... C21D 9/0012
                                               29/895.1
(Continued)

FOREIGN PATENT DOCUMENTS

CA      2843033    *  1/2013  ............ F16C 36/062
CN      201239741       5/2009
(Continued)

OTHER PUBLICATIONS

European Search Report filed in EP 15 15 1976 dated Jun. 8, 2016.
(Continued)

*Primary Examiner* — Jessee R Roe
*Assistant Examiner* — Michael Aboagye
(74) *Attorney, Agent, or Firm* — Rankin, Hill & Clark LLP

(57) ABSTRACT

A roller bearing replacement device for replacement or exchange of a roller bearing of a roller hearth furnace includes a housing that can be sealed off from the environment or external atmosphere that has a sluice through which access to the roller bearing of the roller hearth furnace that is to be replaced from the inside of the housing while excluding the external atmosphere is possible, and at least one roller bearing handling device that is designed for demounting and installing roller bearings and is arranged moveably in the housing and which can be at least partly moved out of the housing through the sluice. Roller bearing replacement or exchange is possible without the roller bearing getting tilted or twisted through its movement during demounting or assembly as the case may be in the roller hearth furnace. The roller bearing replacement device furthermore has a height adjusting device that is coupled with the housing; this height adjusting device is designed (Continued)

and constructed to position the housing vertically and to align the housing on a horizontal plane.

9 Claims, 4 Drawing Sheets

(51) Int. Cl.

| | | |
|---|---|---|
| *B08B 9/00* | (2006.01) | |
| *F27B 9/24* | (2006.01) | |
| *F27B 9/30* | (2006.01) | |
| *F27D 3/02* | (2006.01) | |
| *F27D 25/00* | (2010.01) | |
| *C03B 35/16* | (2006.01) | |

(52) U.S. Cl.
 CPC .............. *F27B 9/2407* (2013.01); *F27B 9/30* (2013.01); *F27D 3/026* (2013.01); *F27D 25/00* (2013.01)

(58) Field of Classification Search
 USPC ........ 266/176, 103, 276, 277; 29/724, 895.1
 See application file for complete search history.

(56) References Cited

U.S. PATENT DOCUMENTS

| | | | | |
|---|---|---|---|---|
| 2016/0208860 A1* | 7/2016 | Balster | ................. | F16C 35/062 |
| 2016/0208861 A1* | 7/2016 | Balster | ................. | F16C 35/062 |

FOREIGN PATENT DOCUMENTS

| | | |
|---|---|---|
| DE | 3004805 | 10/1981 |
| DE | 10 2007 004158 | 7/2008 |
| DE | 10 2011 079771 | 1/2013 |
| EP | 0 033 845 | 8/1981 |
| GB | 2 220 732 | 1/1990 |
| KR | 2003 0053400 | 6/2003 |

OTHER PUBLICATIONS

European Search Report filed in EP 15 15 1782 dated Aug. 13, 2015.
Austrian Search Report dated Aug. 4, 2015.

* cited by examiner

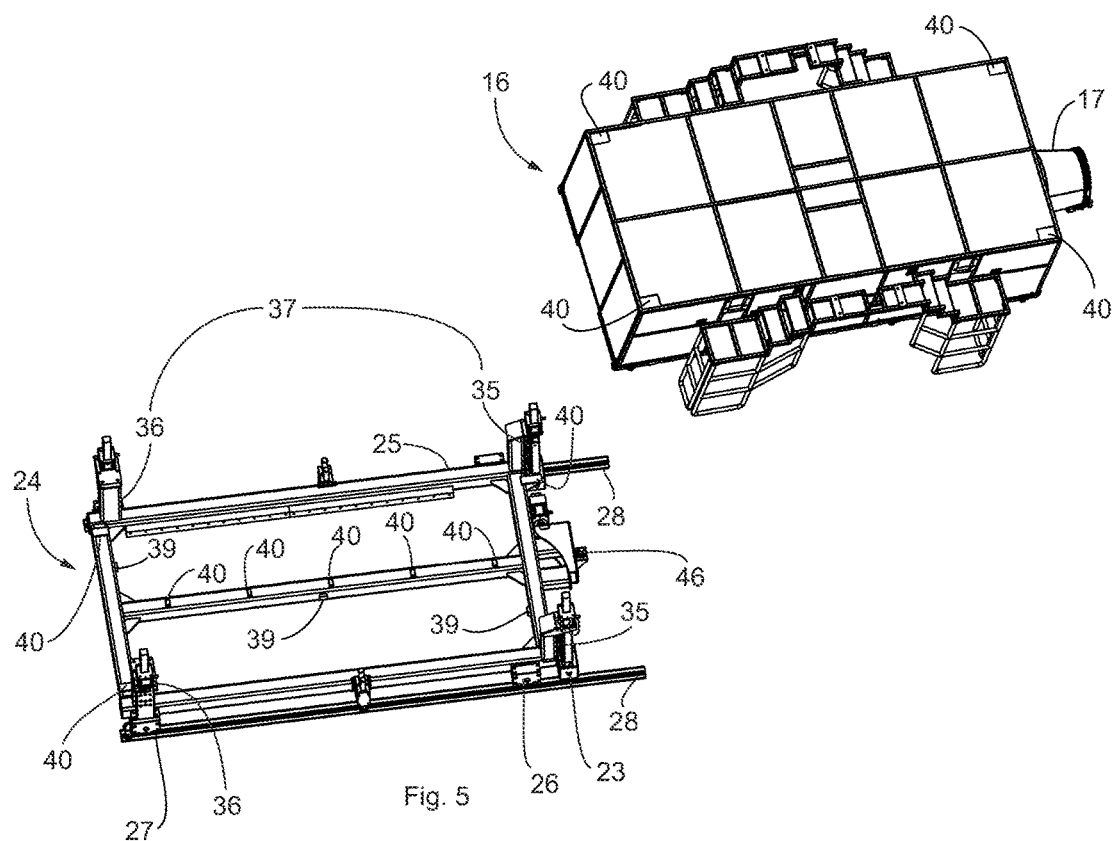
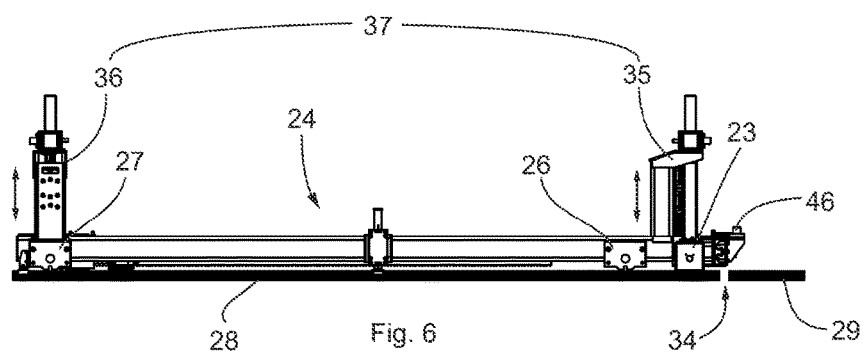
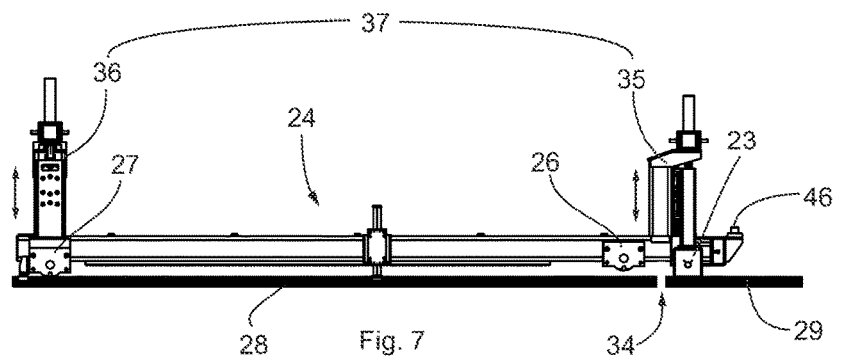

ROLLER BEARING REPLACEMENT DEVICE

BACKGROUND

The invention at hand relates to roller bearing replacement device for exchange of a roller bearing of a roller hearth furnace, that has a housing which can be sealed off from the external atmosphere, that has a sluice on its front side which can be docked, through which access to a roller bearing of the roller hearth furnace that is to be demounted is possible from the inside of the housing while excluding the external atmosphere, and at least one roller bearing handling device that is designed for demounting and installation of roller bearings that is arranged in a moveable manner inside the housing and is designed to move out at least partly out of the housing through the sluice.

A roller bearing replacement device of the type identified at the beginning is for example known from the patent DE 10 2011 079 771 A1. This roller bearing replacement device is moveable laterally near the roller hearth furnace and has an enclosed carrier roller bearing handling device, i.e. housed in a housing. This known roller bearing exchange device is positioned with a platform alongside at the corresponding exchange position for replacement and pulled up at the roller hearth furnace. During an exchange of a roller bearing, a lance of the carrier roller bearing handling device then travels into the hollow roller bearing and lifts up the roller bearing that is to be replaced, whereby the lance then pulls the roller bearing together with an isolation plug that is arranged at the longitudinal end of the roller bearing out of the roller hearth furnace through a hole in which the roller bearing is placed during operation in a rotatable manner.

If the moveable platform is placed on two different supported rails of which one rail is affixed to the wall of the hall and the other rail is affixed to the furnace platform, this can be disadvantageous. This is because the two rails can have different sagging or deflections on the side of the oven and on the side of the hall, which must first be determined by some method and then corrected or balanced out, so that both the roller bearing that is to be demounted as well as the roller bearing that is to be installed can be transported from and to the roller hearth furnace without tilting or twisting each roller bearing during the movement into or out of the roller hearth furnace. It can also happen that in the region of a roller bearing of the roller hearth furnace that is to be replaced it is not positioned exactly horizontal, so that consequently the roller bearing that is deployed in this region is not positioned horizontally, so that this must be taken note of when replacing the roller bearing, in order that the roller bearing that is to be replaced or the roller bearing that is being installed do not tilt or twist inside the roller hearth furnace. In addition to this vertical misalignment, in case of roller bearings that have been installed tilted, horizontal inaccuracies can also be present, if for example the roller bearing furnace is installed inclined with respect to the wall of the furnace. These alignment problems and inaccuracies represent a great problem for the roller bearing replacement device that is known from the patent DE 10 2011 079 771 A1 and can lead to the roller bearing that is being installed getting tilted or twisted.

SUMMARY

Hence the aim of the invention is to achieve a solution that provides a roller bearing replacement device in a simply designed and constructed manner, in which the disadvantages of the state of the art can be avoided and by which the roller bearing replacement is possible without the roller bearing that is being installed and the roller bearing that is being demounted getting tilted or twisted during their installation or demounting as the case may be.

In case of a roller bearing replacement device of the type indicated at the beginning, the task is carried out according to the invention in the following manner: the roller bearing replacement device furthermore has a height adjusting device coupled with the housing; this device positions the housing vertically and orients the housing on a horizontal plane. With the aid of the height adjusting device the housing can consequently be positioned in the vertical direction at different heights, in which the housing can further be aligned in the horizontal plane. According to the invention the housing need not compulsorily be aligned exactly horizontal. Because the horizontal plane can also be a plane that is horizontally inclined.

Advantageous and purposeful embodiments and further advantageous modifications of the invention are the subject matter of the sub claims.

Through the invention, a roller bearing replacement device for exchange of a roller bearing of a roller hearth furnace that distinguishes itself by functional appropriateness is made available for use. A roller bearing replacement device is easily and cost-effectively designed and constructed and ensures that the device is always in alignment of the roller bearing that is to be demounted, in which this position need not compulsorily be always a horizontal position, rather it can also be a position inclined with respect to the horizontal plane. The height adjusting device aligns the roller bearing replacement device in a horizontal plane in such a manner, that the roller bearing replacement device is placed aligned to the roller bearing that is to be demounted, in order to prevent tilting or twisting of the roller bearing that is to be replaced.

It is provided for in the design and construction of the roller bearing replacement device according to the invention, that the housing is placed on a moveable support frame that can at least be moved towards the roller hearth furnace and away from it. Through this, a modular construction of the roller bearing replacement device is given, so that different housings can be placed on different support frames. Consequently, either the support frame is adapted to special requirements or the housing is specially designed and constructed on account of especial requests.

It is especially convenient and advantageous if in the design of the roller bearing replacement device according to the invention, the height adjusting device is affixed to the moveable support frame and abuts the support frame in such a way that the support frame together with the housing placed on it can be positioned vertically by means of height adjusting device and can be aligned along a horizontal plane.

For alignment of the housing with the roller bearing that is to be demounted, it is necessary that the current alignment of the housing be known and if necessary adapted to the required alignment. On the other hand in case of alignment with roller hearth furnaces running essentially horizontally it can always be provided to position the housing likewise horizontally. For this purpose the invention provides for in the design and construction that the height adjusting device has an inclination measuring device that serves at least for alignment of the housing in a horizontal plane. One such inclination measuring device then measures for example the inclination of the housing in two spatial directions, in which it is also conceivable that several measuring devices are provided, that measure the inclination in only one or in all three spatial directions.

In addition to the height adjustment of the housing and if applicable an appropriate alignment of the housing, it is provided for in the design and construction of the support frame according to the invention that the support frame abuts the housing movably, so that the housing is supported in a rotatable manner relative to the support frame. Thus if a roller bearing that is to be replaced is placed inclined in the roller hearth furnace or if the alignment of the roller bearing replacement device is not aligned with the roller bearing that is to be replaced, the housing can be tilted appropriately, so that the roller bearing replacement device is arranged so that it is aligned with the roller bearing that is to be replaced.

In further embodiments of the invention, it is provided that the housing is supported so that it can be rotated on the support frame by using lubricated bearing elements, preferably based on materials containing copper alloys or made of polytetrafluoroethylene (PTFE). The lubricated elements can for example be plates containing red bronze or gun metal, that are arranged as sliding surfaces between housing and support frame and on which the housing is supported and can be rotated relative to the support frame.

Rotation of the housing relative to the support frame can be realized in a simple design and construction by having the rear side of the housing movably coupled with the support frame through a rotation drive, in which the housing can be swiveled around a pivot point arranged on the front side of the housing by means of the rotation drive.

Through the positioning the pivot point, a very exact and efficient swiveling of the housing can be realized. In this regard the invention provides that the pivot point is arranged vertically displaced with respect to the sluice of the housing, in which the pivot point and the sluice are placed stationary with respect to each other.

Should the roller bearing replacement device still not be positioned exactly enough before the roller bearing that is to be replaced, in a further embodiment of the invention there is yet another possibility of lateral positioning in this manner, that the pivot point and the support frame are coupled in a moveable manner with each other by means of a shifting drive, in which the pivot point can be moved relative to the support frame by means of the shifting drive. This movement of the pivot point relative to the support frame can also then be utilized, if the roller bearing handling device is out of alignment with the longitudinal axis of the roller bearing that is to be replaced due to a tilting of the housing.

The height adjusting device can be designed as a pulley or similar, which ensures, that the housing can be lifted or lowered in order to adjust it to the height of the roller bearing that is to be replaced. A possibility that is simple in design and construction and cost-effective lies in the height adjusting device including at least one front lifting element which is affixed on the front side of the housing on the support frame. In this way the inclination and if applicable the height of the front side of the housing can be adapted.

Naturally it is provided for in further embodiments of the invention, that the height adjusting device has at least one rear lifting element that is affixed in the region of the rear side of the housing on the support frame.

With the help of the front and rear lifting elements, the housing can be displaced overall in its height and adapted to the height of the roller bearing that is to be demounted, in which the front and rear lifting elements can be displaced separately, so that an inclination of the housing can also be adapted or compensated for.

Finally the invention provides for an assembly that has a roller hearth furnace for heat-treatment of components and a roller bearing replacement device designed for replacement of a roller bearing of the roller hearth furnace according to one of the claims.

As already mentioned above, the expression "alignment on a horizontal plane" does not only mean a horizontal alignment of the housing. Rather this manner of expression includes in addition to a horizontal alignment, an inclined alignment of the housing as well.

It shall be understood that the aforementioned and following characteristics shall be applicable or utilizable not only in the respectively mentioned combination but also in other combinations or as unique characteristics, without departing from the framework of the present invention. The framework of the invention is only defined by the claims.

BRIEF DESCRIPTION OF THE DRAWINGS

Further details, characteristics and advantages of the object of the invention arise from the following description in conjunction with the drawing in which a preferred embodiment of the invention is depicted by way of example. In the drawing are shown:

FIG. 5 is a perspective view of the underside of the housing and of the support frame, FIG. 6 is a side view of the support frame before the movement of the roller bearing replacement device towards the roller hearth furnace, FIG. 7 is a side view of the support frame during the movement of the roller bearing replacement device towards the roller hearth furnace.

DETAILED DESCRIPTION

Figure 1:
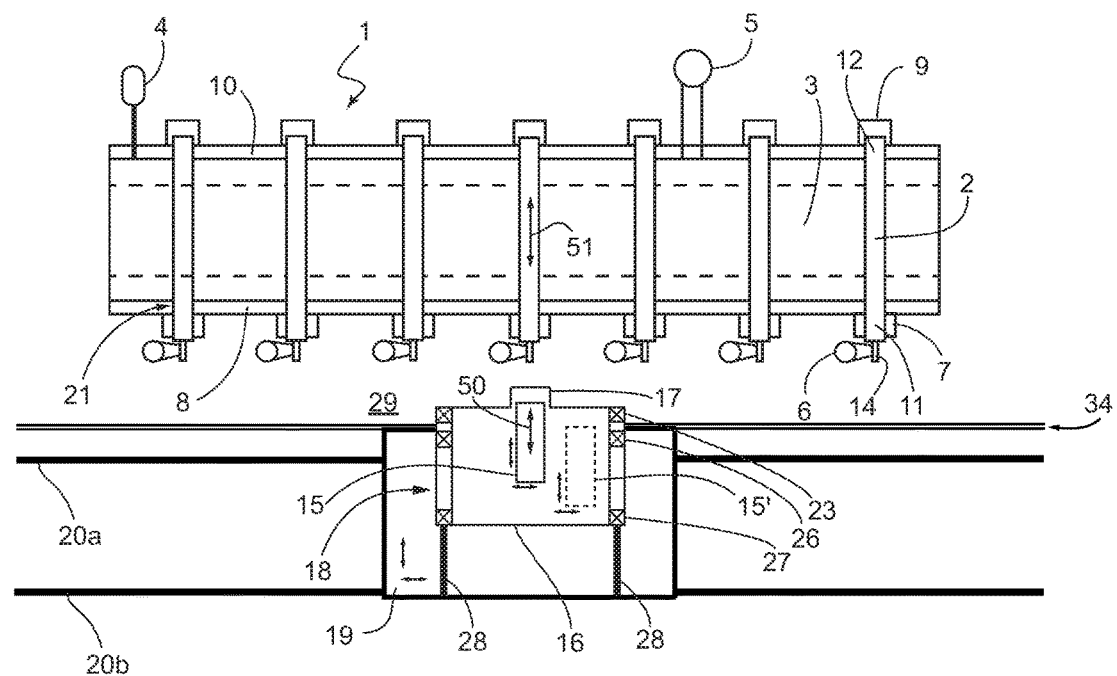
FIG. 1 is a systematic plan (top view) of a roller hearth furnace with a roller bearing replacement device according to the invention which is designed and constructed so as to be moveable laterally along the roller hearth furnace.

A systematic top view or plan of the roller hearth furnace 1 is shown in FIG. 1 which each of the roller bearings 2 are stored in rotatable manner by means of a respective bearing system at their longitudinal ends 11, 12. In the embodiment depicted in FIG. 1, the roller hearth furnace 1 is designed and constructed for continuous heat treatment of steel rolls 3. FIG. 1 is an exemplary depiction and shows only a section of the roller hearth furnace 1. For this sectional view the roller hearth furnace 1 has seven roller bearings 2, in which only one of the seven roller bearings 2 is provided with various reference signs for reasons of clarity. The roller hearth furnace 1 is hermetically sealed from its environment and is operated under a protective atmosphere. The roller bearings 2 are arranged alongside the longitudinal axis of the roller hearth furnace 1 and transport the steel roll 3, in which the process takes place at temperatures exceeding 1000° C. inside the roller hearth furnace 1. A heating unit 4 ensures maintenance of the temperature necessary for the process inside the roller hearth furnace 1, whereas a protective gas device 5 is responsible for regulating the desired protective gas atmosphere inside the roller hearth furnace 1. Each roller bearing 2 is connected outside the roller hearth furnace 1 with a drive unit 6, which drives the rotation of the respective roller bearing 2, in order to transport the steel roll 3 through the roller hearth furnace 1. The bearing system of a roller bearing 2 not depicted in detail in the Figures includes a first bearing element 7 that is arranged on a first side wall 8 of the roller hearth furnace 1 and which must be detached from the first side wall 8 in case of a roller bearing exchange, and a second bearing element 9 which is placed on the second side wall 10 of the roller hearth furnace 1 that lies on the opposite side of the first side wall 8 and which must not be detached from the second side wall 10 in case of a roller bearing exchange but rather remains there for placement of the new roller bearing 2 that is to be inserted. In the bearing system each roller bearing 2 is placed so that it can rotate in the roller hearth furnace 1 with the first longitudinal end 11 by means of the first bearing element 7 and with the second longitudinal end 12 by means of the second bearing element 9, in which the first bearing element 7 and the second bearing element 9 are both fitted gas-tight with insulation plugs in such a manner that no protective gas can escape from the inside of the roller hearth furnace 1 during the operation of the furnace. From the first longitudinal end 11 of each of the roller bearings 2 a shaft journal 14 extends or protrudes externally towards the outside from a first bearing element 7 in each case and is connected for drive purposes with an associated drive unit 6, by means of which one roller bearing 2 is rotated during the operation of the roller hearth furnace 1. During a replacement of a roller bearing 2, firstly the drive unit 6 is detached from the shaft journal 14, before the roller bearing 2 that is to be demounted is removed from the roller hearth furnace 1 together with the first bearing element 7, whereas the second bearing element 9 remains in the roller hearth furnace 1 and pivots the roller bearing 2 that is to be inserted.

Figure 2:
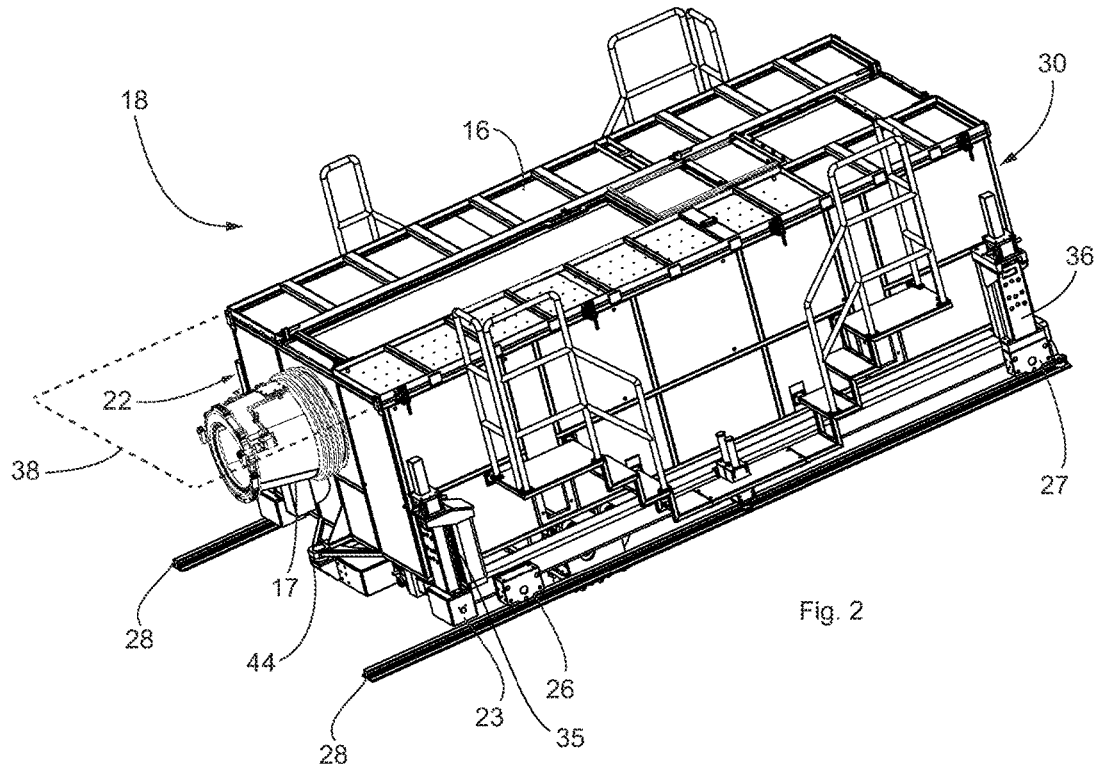
FIG. 2 is a perspective view of the roller bearing replacement device according to the invention.

As further schematically shown in FIG. 1, a roller bearing replacement device 18 which is shown in perspective view in FIG. 2 is arranged laterally from the roller hearth furnace 1 for replacement of a roller bearing 2 of the roller hearth furnace 1. The roller bearing replacement device 18 is positioned on a moveable platform 19 and is moved laterally alongside the roller hearth furnace 1 with the aid of the moveable platform 19 in order to be positioned in front of the roller bearing 2 that is to be exchanged. The moveable platform 19 itself is placed moveably on rails 20a, 20b that extend laterally alongside the first side wall 8 of the roller hearth furnace 1, in which the roller bearing replacement device 18 is designed so as to be able to move on the moveable platform 19 towards as well as away from the side wall 8 of the roller hearth furnace 1. For roller bearing replacement, the first bearing element 7 is detached from the first side wall 8 with insulation plugs and the roller bearing 2 that is to be replaced together with the first bearing element 7 with insulation plugs is pulled out of the roller hearth furnace 1 with the help of a roller bearing handling device 15 of the roller bearing replacement device 18. In addition to the roller bearing handling device 15, the roller bearing replacement device 18 includes a housing 16 that can be sealed off from the environmental atmosphere, which has a sluice 17 that serves to couple with the roller hearth furnace 1 through which access to a roller bearing 2 that is to be demounted from the housing 16 while excluding the atmosphere of the environment is possible. The roller bearing handling device 15 is placed moveably in the housing in such a way that it can be moved to the side wall 8 as also laterally to the side wall 8. Thus a single roller bearing handling device 15 can be used both for demounting a roller bearing 2 from the roller hearth furnace 1 as well as for installing a new roller bearing 2 in roller hearth furnace 1. It is also conceivable that a roller bearing handling device 15 is used for demounting and subsequently moved away from the oven, after which another roller bearing handling device 15' that is loaded with the roller bearing 2 that has to be installed is deployed for mounting and this is shown schematically in FIG. 1. Thus both the roller bearing handling devices 15 and 15' can be positioned moveably within the gas-tight housing 16 so that they can be positioned in front of the sluice 17 and also can be moved at least partly out of the housing 16 through the sluice 17. Such a roller bearing replacement can thus take place with one or two roller bearing handling devices 15, 15', in which the roller hearth furnace 1 cooled down to 800° C. and is purged or flushed with nitrogen gas before the roller bearing replacement.

In order to keep the time required for roller bearing replacement as short as possible and hence minimize the down time, the roller bearing replacement is carried out laterally with respect to the roller hearth furnace 1, in which the operation of the roller bearing handling device 15, 15' takes place shielded from the external environmental atmosphere. Accordingly one or both of the roller bearing handling devices 15, 15' are operated in a housing 16 that is sealed off from the external environment and atmosphere. It is in such a gas-tight housing or a housing 16 that is sealed off from the external atmosphere that one or both the roller bearing handling devices 15, 15' are arranged moveably and housed. Even in case of a roller bearing replacement with such a gas-tight housing 16 that is hermetically sealed from the external environment, the drive unit 6 is detached from the shaft journal 14 of the roller bearing 2 before the actual roller bearing change. Through the sluice 17 the housing 16 can be docked in a sealed manner with respect to the outer atmosphere or environment on to the roller hearth furnace 1. In the process the sluice 17 encloses the first bearing element 7, which is then removed out of the roller hearth furnace 1 together with the roller bearing 2 that is to be demounted. Only shortly before the pulling out of the first bearing element 7 with insulation plugs, however after the docking of the sluice 17 on the roller hearth furnace 1 and the sealing off of the first bearing element 7 with insulation plugs is the gas-tightness of the first bearing element 7 lifted with insulation plugs. Thus, either one or both of the roller bearing handling devices 15, 15' are arranged in a housing 16 that is sealed gas-tight from the outer environment and at least partially extensible out of this through the sluice 17 in a wall of the housing 16, in order to have access to the roller bearing 2 that is to be demounted. After the docking or coupling of the housing 16 on to the roller hearth furnace 1, a protective gas atmosphere is introduced into the housing 16 itself which corresponds to the protective gas atmosphere of the inside of the roller hearth furnace 1. When accommodated within the housing 16, the roller bearing handling device 15 or both the roller bearing handling devices 15, 15' can be moved within the housing 16 at least in two spatial directions, as indicated by the arrow in FIG. 1. Additionally the roller bearing replacement device 18 or the housing 16 is moveable in at least two spatial directions, in order to pull up laterally at the desired roller bearing 2 and to draw closer to the first side wall 8 for docking.

The roller bearing 2 that is to be replaced is pulled out through an opening 21 (see FIG. 1) from the first side wall 8 of the roller hearth furnace 1. While pulling out the roller bearing 2 that is to be replaced and also during installation of a new roller bearing 2, it must be ensured that the roller bearing to be handled, that is the roller bearing 2 that is to be demounted or installed, is moved in a straight line out of or into the opening 21, in order to prevent tilting or twisting of the roller bearing 2 that is being moved in the opening 21 and to ensure that the roller bearing 2 is pulled out in a straight line from the second bearing element 9 and during installation is pushed into the second bearing element 9.

The various functionalities of the roller bearing replacement device 18 according to the invention become understandable upon observation of individual procedures during demounting of a roller bearing 2. As already mentioned above, the roller bearing replacement device 18 is placed on a moveable platform 19. The moveable platform 19 itself arranged on rails 20a and 20b, which run parallel to the roller hearth furnace 1, traversable sideways next to and along the roller hearth furnace 1, so that for a roller bearing exchange, at first the moveable platform 19 is moved along the roller hearth furnace 1 until the moveable platform 19 is in front of the roller bearing 2 that is to be replaced. In this the rail 20a can be a rail on the furnace platform 29 and the rail 20b can be a rail on the production hall wall. When the lateral position at the roller bearing 2 that is to be exchanged is reached by the movement of the moveable platform 19, then the roller bearing replacement device 18 is moved in the direction of the first side wall 8 of the roller hearth furnace 1.

Figure 3:
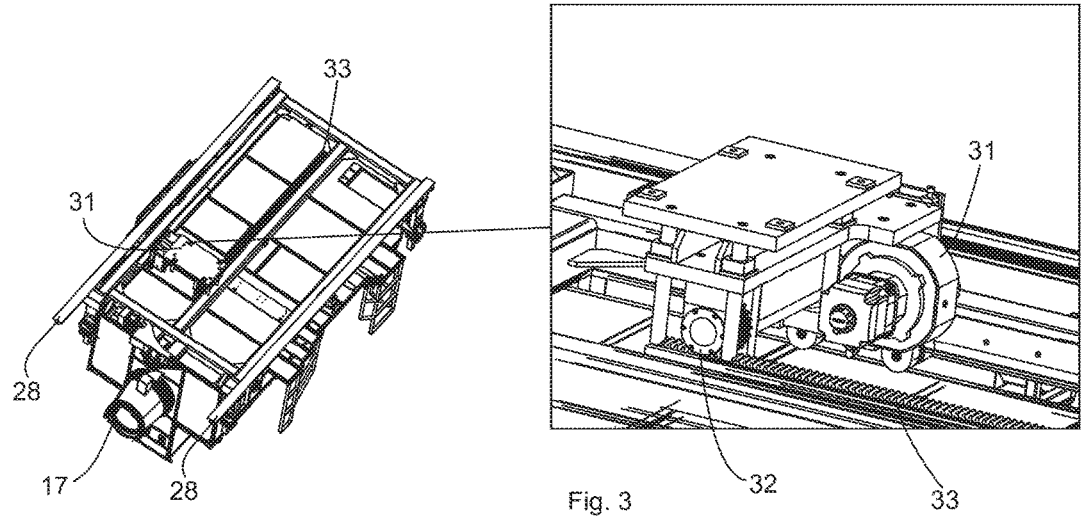
FIG. 3 is a bottom view of the roller bearing replacement device according to the invention and an enlarged depiction of a drive unit of the roller bearing replacement device.
Figure 4:
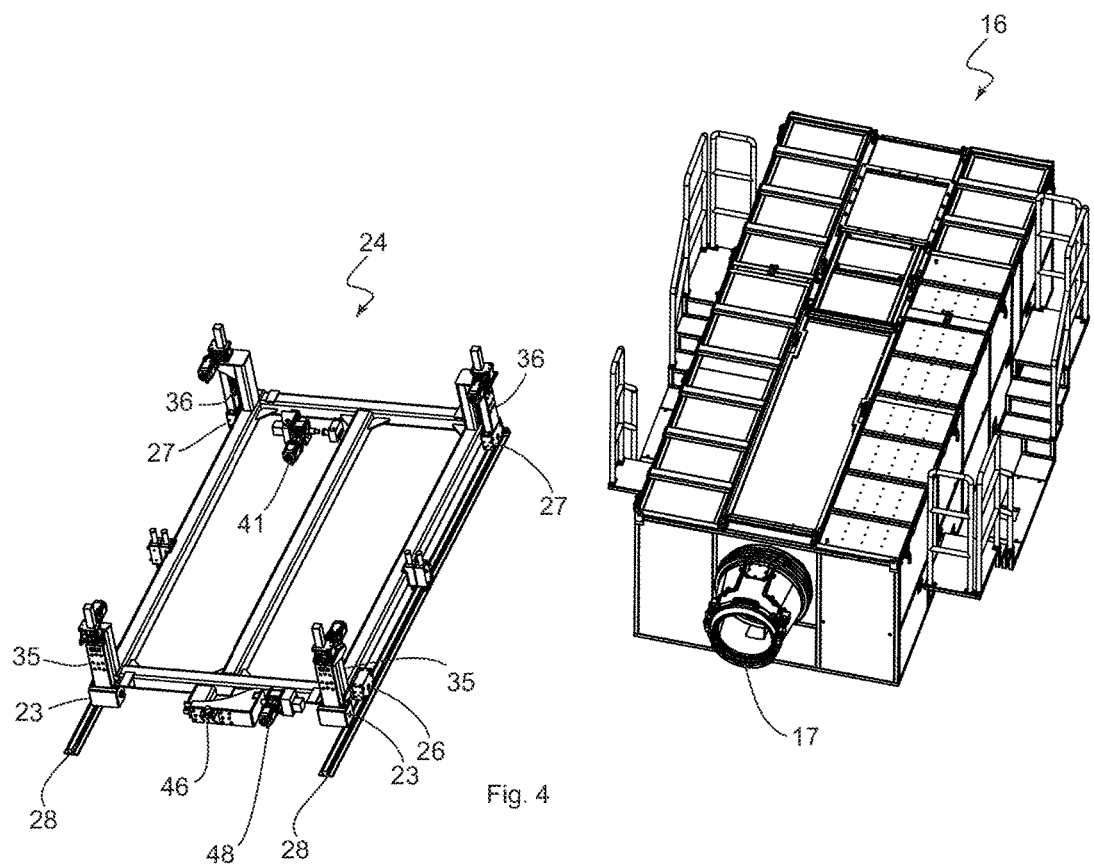
FIG. 4 depicts the roller bearing replacement device with its housing and its support frame with details
Figure 8:
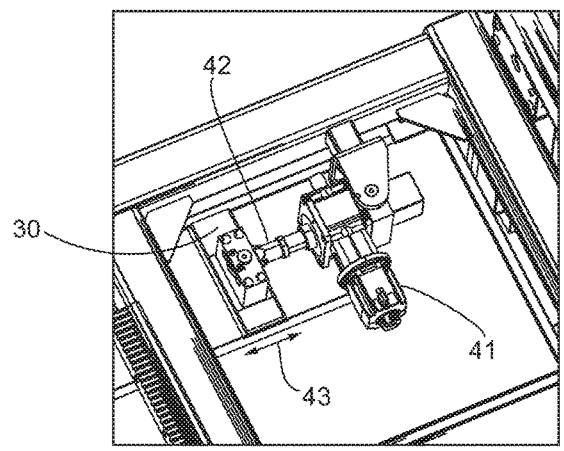
FIG. 8 is an enlarged view of a rotation drive affixed to the support frame
Figure 9:
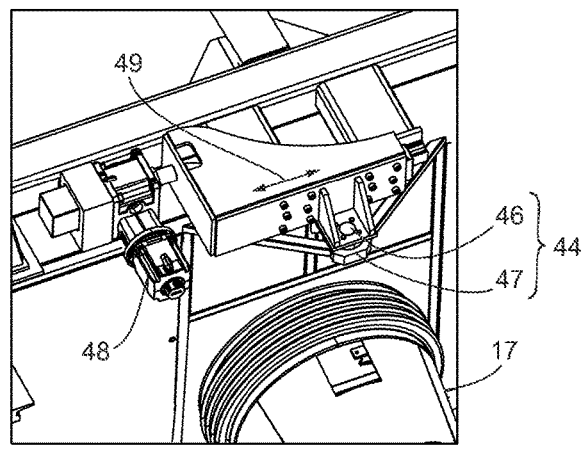
FIG. 9 is an enlarged view of a shifting drive affixed to the support frame (view from below)
Figures 10, 11, 12:
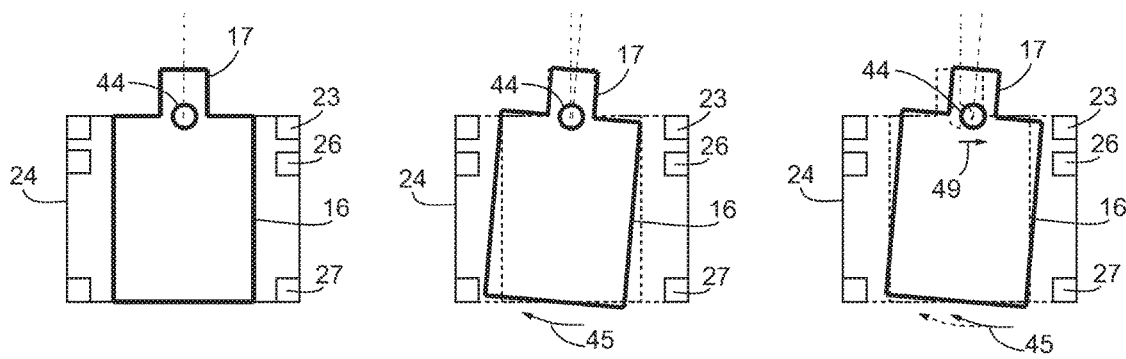
FIG. 10 is a schematic view of the roller bearing replacement device in an initial position.
FIG. 11 is a schematic view of the roller bearing replacement device in a position, in which the housing is rotated or swiveled.
FIG. 12 is a schematic view of the roller bearing replacement device in a position, in which the housing is rotated or swiveled, and a pivot point is moved laterally.

For this purpose the roller bearing replacement device 18 is mounted with several gear pairs, which will be described below with reference to the FIGS. 1 to 12. The housing 16 of the roller bearing replacement device 18 is placed on a support frame 24 that is designed to be moveable. The support frame 24 is for example visible from the exploded views of FIGS. 4 and 5 to 7 and includes, in addition to a frame 25, a front gear pair 23, a middle gear pair 26 and a rear gear pair 27. The gear pairs 26, 27 can move on the guide rails 28 (see for example FIG. 1), which are placed on the moveable platform 19 and run or are aligned cross or perpendicular to the roller hearth furnace 1. During a roller bearing exchange, the roller bearing replacement device 18 or the support frame 24 is at first supported by the rear gear pair 27 and the middle gear pair 26. In this the roller bearing replacement device 18 is moved in the direction of the roller hearth furnace 1 till such time as the middle gear pair 26 reaches the end of the guide rail 28. A drive unit 31 which is shown in FIG. 3 is provided for the movement towards the roller hearth furnace 1 and away from it. The drive unit 31 drives a gear wheel 32 which engages in the teeth of a gear rack 33 that is affixed to the moveable platform 19 so that the roller bearing replacement device 18 is able to move alongside the gear rack 33 forward up to the roller hearth furnace 1 and back from it (see for example FIG. 3).

For overcoming a gap 34 between the moveable platform 19 and the furnace platform 29, a change of support takes place upon reaching the end of the guide rail 28, in which case the roller bearing replacement device 18 is now no longer supported by the middle gear pair 26 but is rather supported by the front gear pair 23 together with the rear gear pair 27. The situation is described in FIG. 6, in which the roller bearing replacement device 18 is exclusively supported by the middle gear pair 26 and the rear gear pair 27 on the moveable platform 19, while in contrast FIG. 7 shows the situation after the change mentioned above, in which the roller bearing replacement device 18 is supported by the front gear pair 23 and the rear gear pair 27 and consequently no longer supported by the middle gear pair 26.

For this replacement each gear wheel of the front gear pair 23 is placed on a respective front lifting element 35, in which both front lifting elements 35 are depicted as spindle elements in the embodiment depicted and enable a linear displacement of the front gear pair 23 towards the support frame 24 in the vertical direction (either upwards or downwards), by which finally the height at which the housing 16 is arranged is changed. Accordingly the front gear pair 23 is moveable in the vertical direction relative to the support frame 24, whereas the middle gear pair 26 is fixed stationary on the support frame 24. In FIG. 6, the front gear pair 23 is arranged in a rest position, in which the middle gear pair 26 together with the rear gear pair 27 supports the roller bearing replacement device 18 on the guide rails 28.

The crossing of the gap 34 is achieved with the aid of the front lifting element 35, because the first gear pair 23 is only lowered by the front lifting element 35 when the furnace platform 29 is arranged below the front gear pair 23 or when the middle gear pair 26 has been moved till the end of the guide rails 28. Additionally the front lifting element 35 serves to align the roller bearing replacement device 18 towards the roller bearing 2 that is to be replaced, so that the roller bearing 2 that is to be replaced can be pulled out of the roller hearth furnace 1 without tilting or twisting. In order to position the roller bearing replacement device 18 overall at the installation height of the roller bearing 2 that is to be replaced, the rear gear pair 27 which supports the support frame 24 is also placed on its respective rear lifting element 36, which in turn is likewise constructed as a spindle lifting element. With the help of the front and rear lifting elements 35 and 36, the support frame 24 which supports the housing 16 can also be moved in its height and adjusted to the height of the roller bearing 2 that is to be demounted, in which the front and rear lifting elements 35, 36 can be moved separately, so that a tilting of the housing 16 can be introduced or compensated for. The front lifting elements 35 which can be adjusted independently of each other and which are affixed on the support frame 24 in the region of the front side 22 of the housing 16, and the rear lifting elements 36, which can be adjusted independently of each other and which are affixed on the support frame 24 in the region of the rear side 30 of the housing 16, belong to a height adjusting device 37 that is coupled with the housing 16 and is moreover vertically positioned over the housing 16 and the housing 16 is aligned on a horizontal plane 38 (see FIG. 2). In this the horizontal plane 38 can be an exactly horizontal plane or a plane that is slightly inclined with respect to the horizontal, and this depends on whether the roller bearing 2 that is to be demounted is horizontal or installed slightly inclined in the roller hearth furnace 1.

In order to avoid a tilting or twisting of the roller bearing 2 that is being handled during its installation or demounting, it is necessary in a first step of the roller bearing replacement that the sluice 17 which is built into the front side 22 of the housing 16 takes up a vertical position, in which it encloses or covers up the first bearing element 7. For this purpose the front and rear lifting elements 35 and 36 are appropriately steered and thus they change their relative position on the housing 16 which is supported by the support frame 24 to the front and rear gear pairs 23 and 27, in which all four lifting elements 35 and 36 can be moved independently of each other in order to impart or balance off any inclination of the housing 16 if necessary, so that the roller bearing handling device 15 can pull out the corresponding roller bearing 2 from the roller hearth furnace 1 without any tilting or twisting. In other words, the height adjustment device 37 is affixed to the moveable support frame 24 and supports the support frame 24 in such a way that with the help of the height adjustment device 37, the support frame 24 can be vertically positioned together with the housing 16 and can also be aligned in a horizontal plane 38 with respect to the roller bearing 2 that is to be replaced. For enabling such a vertical positioning and horizontal alignment, the height adjusting device 37 has several inclination measuring devices 39 (see for example FIG. 5), in which also a single inclination measuring device 39 would also suffice if it could measure the inclination in all three spatial directions. In the embodiment depicted, several two-dimensional inclination measuring devices 39 are used, that are placed on the support frame 24 and serve to align the housing 16 in a horizontal plane 38. In this the inclination measuring devices 39 check the current alignment of the housing 16 that is also another differing alignment which occurs upon activating the lifting elements 35, 36. Accordingly the inclination measuring devices 39 monitor all axes or spatial directions of the whole support frame 24, in which the adaptation of the inclination and alignment in the vertical direction takes place through the height adjustment device 37 with its elements 35 and 36. Thus the four lifting elements 35, 36 take care of the height alignment of the support frame 24, in which the lifting elements 35, 36 can be moved individually or as a group.

The alignment of the roller bearing replacement device 18 corresponding to a horizontal plane 38 in relation to the roller bearing 2 to be replaced alone however does not guarantee that the roller bearing 2 does not tilt or get twisted during demounting. Since it is possible that although the roller bearing 2 is not tilted but is installed inclined in the roller hearth furnace 1 or that the roller bearing replacement device 18 is not positioned exactly fully aligned with the roller bearing 2 that is to be replaced. Hence, in the case of the roller bearing replacement device 18 according to the invention, the support frame 24 supports the housing 16 moveably in such a manner that the housing 16 can be swiveled in a supported manner relative to the support frame 24. In order that the housing 16 can also be swiveled with respect to the support frame 24, lubricated bearing elements 40 are provided, that are placed or arranged both on the frame 25 of the support frame 24 and on the underside of the housing 16, as shown in FIG. 5 for example. The lubricated bearing elements 40 are consequently ordered or placed between the housing 16 and the support frame 24 so that the housing 16 does not lie directly on the support frame 24. The lubricated bearing elements 40 are composed of a material that has a copper-based alloy. In the embodiment described, the lubricated bearing elements 40 are composed of red bronze or gun metal, in which other alternative possibilities for the swivel support of the housing 16 on the support frame 24 are naturally conceivable. Pivoting without the lubricated bearing elements 40 is also conceivable, in which the lubricated bearing elements 40 ensure a smooth and jerk-free alignment of the housing 16. In the embodiment depicted, the plate type lubricated bearing elements 40 are mounted on the underside of the housing 16 on its edge and on the middle support of the support element 24.

Supporting the housing 16 by means of the lubricated bearing elements 40 however does not take care of the relative swiveling of the housing 16 to the support frame 24, but rather supports and only eases this movement. The movement is effected by a rotation drive 41, which is placed stationary on the support frame 24 and which drives a driving rod 42, which is placed on the rear side 30 of the housing 16 (see for example FIGS. 4 and 8). The housing 16 can be moved or displaced in the cross direction 43 (see arrow in FIG. 8) on its rear side 30 by means of the rotation drive 41. In order now to align the housing 16 together with the roller handling device 15 to the roller bearing 2 that is to be replaced, the housing 16 can be pivoted relative to the support frame 24 from the ground position shown in FIG. 10, for which purpose the housing 16 has a pivot point 44 on its front side 22, about which the housing 16 pivots or turns, when the rotation drive 41 deflects or moves the rear side 30 of the housing 16, as shown exemplarily in FIG. 11, and which is elucidated by the arrow 45. The pivot point 44 is defined by a king pin 46 on the side of the support frame 24 and a king pin take up point 47 on the side of the housing 16 (see for example FIG. 9). The pivot point 44 is arranged vertically displaced with respect to the sluice 17 of the housing 16, in which however the pivot point 44 and the sluice 17 are placed stationary with respect to each other. Consequently, the rear side 30 of the housing 16 is coupled and connected moveably with the support frame 24 through the rotation drive 41, so that the housing 16 can be pivoted by means of the rotation drive 41 around the pivot point 44 that is arranged or placed on the front side 22 of the housing 16. The king pin 46 is provided for the horizontal alignment of the roller bearing handling device 15 with respect to the roller bearing 2 that is to be demounted; through this alignment errors between the longitudinal axis of the roller bearing 2 that is to be demounted and the longitudinal axis of the roller bearing handling device 15 can be compensated for. Through the rotation drive 41, the rear housing 16 is pivoted or rotated through the king pin 46 and thus the longitudinal axis of the roller bearing handling device 15 can be aligned with the roller bearing 2 that is to be replaced.

A pivoting or turning of the housing 16 relative to the support frame 24 can however lead to the situation that the roller bearing handling device 15 that is intended for the demounting and also the sluice 17 are no longer exactly aligned with the roller bearing 2 that is to be replaced, since for this purpose the moveable platform 19 was positioned at the appropriate position in front of the roller hearth furnace 1. To counteract this offset or misalignment that is caused by the swiveling or rotation, a shifting drive 48 is affixed to the front side of the support frame 24, through which the king pin 46 can be moved crosswise to the support frame 24, as shown by the arrow 49 in FIG. 9 and shown exemplarily in FIG. 12. In order to compensate for a possible lateral displacement or misalignment, the pivot point 44 and the support frame 24 are moveably coupled and joined with each other through a shifting drive 48, in which the pivot point 44 can be moved relative to the support frame 24 by means of the shifting drive 48. The king bolt 46 is arranged on a skid, which can be moved sideways on the front side of the support frame 24 with the aid of the shifting drive 48

In summary, a roller bearing replacement device 18 has been described above, that serves to replace roller bearings. The roller bearing replacement device 18 includes a housing 16 that can be sealed off from the external atmosphere or environment; this housing 16 has on its front side 22 a sluice 17 which can be coupled to the roller hearth furnace 1; through this sluice, access to the roller bearing 2 of the roller hearth furnace 1 that is to be demounted is possible from the inside of the housing 16 while excluding the external atmosphere; and the roller bearing replacement device 18 has at least one roller bearing handling device 15, 15' which is arranged moveably in the housing 16 and which is at least partly moveable outside the housing 16 through the sluice 17 for demounting and mounting the roller bearing 2. According to the invention the roller bearing replacement device 18 furthermore has a height adjusting device 37 that is coupled with the housing 16; this height adjusting device is designed and constructed so as to be able to position the housing 16 vertically and align it on a horizontal plane 38. The roller bearing replacement device 18 according to the invention is a component part of an assembly which has the roller hearth furnace 1 for the heat treatment of work pieces 3 and also the roller bearing replacement device 18 that is designed and constructed for replacement of a roller bearing 2 of the roller hearth furnace 1. The roller bearing replacement device 18 can be displaced or moved with the aid of the height adjusting device 37 to the height of the roller bearing 2 that is to be replaced (see arrows in the FIGS. 6 and 7 near the lifting elements 35 and 36), in which the rotation drive 41 and if needed the shifting drive 48 in addition ensure that the longitudinal drive 50 of the roller bearing handling device 15 can be aligned properly or flushed along the longitudinal drive 51 of the roller bearing 2 that is to be demounted.

The invention described above is naturally not limited to the embodiment described and depicted. It is obvious that in the embodiment depicted in the drawing numerous manifest or self-evident alterations or modifications can be undertaken according to the intended usage according to the specialist, without thereby egressing from the realm of the invention. To the invention belongs all that which is contained in the description and/or depicted in the drawing, including that which deviates from the concrete embodiment and is self-evident or manifest for the specialist.

The invention claimed is:

1. A roller bearing replacement device for replacement or exchange of a roller bearing of a roller hearth furnace, comprising:
    a housing configured to be sealed off from an external environment or atmosphere, which on its front side has a sluice configured to be coupled to the roller hearth furnace, through which access to a roller bearing of the hearth furnace that is to be demounted while excluding the external atmosphere from the inside of the housing is possible, and
    at least one roller bearing handling device that is designed and constructed for demounting and installing of roller bearings, which is placed moveably in the housing and which can be moved out at least partly through the sluice from the housing, and
    a height adjusting device that is coupled with the housing; the height adjusting device being designed and constructed to position the housing vertically and to align the housing on a horizontal plane, which can be horizontally inclined,
    wherein the housing is placed on a moveable support frame, that can at least be moved towards the roller hearth furnace and away from the roller hearth furnace, and
    wherein the support frame supports the housing moveably so that the housing can be pivoted relative to the support frame.

2. The roller bearing replacement device according to claim 1, wherein the height adjusting device is affixed to the moveable support frame in such a way that the support frame can be positioned vertically and it can be aligned on a horizontal plane together with the housing that is placed on the support frame it by means of the height adjusting device.

3. The roller bearing replacement device according to claim 1, wherein the height adjusting device has at least one inclination measuring device meant for aligning the housing on a horizontal plane.

4. The roller bearing replacement device according to claim 1, wherein the housing is supported on the support frame by means of lubricated bearing elements in a manner that the support frame can be pivoted; the lubricated bearing elements are preferably made of a material containing a copper-based alloy or of polytetrafluroethylene (PTFE).

5. The roller bearing replacement device according to claim 1, wherein the rear side of the housing is coupled in a moveable manner through a rotation drive with the support frame, in which the housing can be pivoted around a pivot point by means of a rotation drive that is arranged on the front side of the housing.

6. The roller bearing replacement device according to claim 5, wherein the pivot point is arranged vertically displaced with respect to the sluice of the housing, in which the pivot point and the sluice are placed stationary with respect to each other.

7. The roller bearing replacement device according to claim 5, wherein the pivot point and the support frame are coupled moveably with each other via a shifting drive, in which the pivot point can be moved relative to the support frame by means of the shifting drive.

8. The roller bearing replacement device according to claim 1, wherein the height adjusting device has at least one front lifting element which is affixed on the support frame in the region of the front side of the housing.

9. The roller bearing replacement device according to claim 1, wherein the height adjusting device has at least one rear lifting element which is affixed on the support frame in the region of the rear side of the housing.

* * * * *